United States Patent
Randell

(10) Patent No.: US 9,727,519 B2
(45) Date of Patent: Aug. 8, 2017

(54) EMULATING BI-DIRECTIONAL BUS COMMUNICATION USING SEPARATE UNIDIRECTIONAL CHANNELS

(71) Applicant: BlackBerry Limited, Waterloo (CA)

(72) Inventor: Jerrold Richard Randell, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 204 days.

(21) Appl. No.: 14/835,797

(22) Filed: Aug. 26, 2015

(65) Prior Publication Data

US 2017/0060808 A1  Mar. 2, 2017

(51) Int. Cl.
  *G06F 13/00* (2006.01)
  *G06F 13/42* (2006.01)
  *G06F 13/364* (2006.01)
  *G06F 13/40* (2006.01)
  *H04L 12/40* (2006.01)

(52) U.S. Cl.
  CPC ........ *G06F 13/4282* (2013.01); *G06F 13/364* (2013.01); *G06F 13/404* (2013.01); *H04L 12/40* (2013.01)

(58) Field of Classification Search
  CPC .............................. G06F 13/4282; G06F 13/364
  See application file for complete search history.

(56) References Cited

U.S. PATENT DOCUMENTS

| 5,490,134 | A | 2/1996 | Fernandes et al. |
| 6,033,441 | A | 3/2000 | Herbert et al. |
| 6,636,955 | B1 | 10/2003 | Kessler et al. |
| 7,747,888 | B2 | 6/2010 | Frodsham et al. |
| 8,558,577 | B1* | 10/2013 | Soriano Fosas . H03K 19/01759 326/62 |
| 2001/0014925 | A1 | 8/2001 | Kumata |
| 2016/0147684 | A1* | 5/2016 | Sengoku ................. G06F 13/24 710/105 |

OTHER PUBLICATIONS

Extended European Search Report dated Dec. 16, 2016.
Audio Engineering Society, Convention e-Brief, Presented at the 137th Convention, Oct. 9-12, 2014 Los Angeles, CA, USA.
AN 433: Constraining and Analyzing, Source-Synchronous Interfaces, Jan. 2015 Altera Corporation.
Mipi alliance, Draft Specification for SoundWireSM, Version 0.9, Revision 02, Dec. 9, 2014.

* cited by examiner

*Primary Examiner* — Zachary K Huson
(74) *Attorney, Agent, or Firm* — Rowand LLP

(57) ABSTRACT

Methods and systems are described for emulating a bi-directional synchronous communications protocol for bi-directional bus communication using unidirectional channels between a master device and a slave device. The master device includes a physical interface to the unidirectional channels that resynchronizes outgoing and incoming data streams in order to reconstruct a bitstream that is compliant with the bi-directional synchronous communications protocol. The reconstructed bitstream is input to the master digital interface controller as though it had been received from the slave device.

20 Claims, 6 Drawing Sheets

EMULATING BI-DIRECTIONAL BUS COMMUNICATION USING SEPARATE UNIDIRECTIONAL CHANNELS

FIELD

The present application generally relates to a communications bus and, in particular, to a modified bus that uses source synchronous communications.

BACKGROUND

There are a number of communications protocols relating to bus communications, particularly for circuit-board level inter-chip communications. In some of these bus architectures, there is a single common data line and the protocol manages control and access to the data line. One popular example is the Inter Integrated Circuit ($I^2C$) bus communication protocol. $I^2C$-bus (hereinafter $I^2C$) is described in "$I^2C$-bus specification and user manual", UM10204, Rev. 6, Apr. 4, 2014, NXP Semiconductors N.V. A recently-developed protocol from the Mobile Industry Processor Interface Alliance (MIPI® Alliance) is the SoundWire™ protocol. SoundWire™ is intended for use with small cost-sensitive audio peripherals.

One of the drawbacks of the SoundWire™ specification is that it uses a single bi-directional channel for data transfer between devices. The bi-directional channel inherently limits the speed of the communications due to the fact that each bit time period must allow for worst case round trip transmission delay. For example, each minimum bit time must include transmitter output drive delay, channel delay, receiver input delay, and other logic delays required for a round trip. In practical implementations of SoundWire™, 20 MHz may be the fastest achievable speed.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
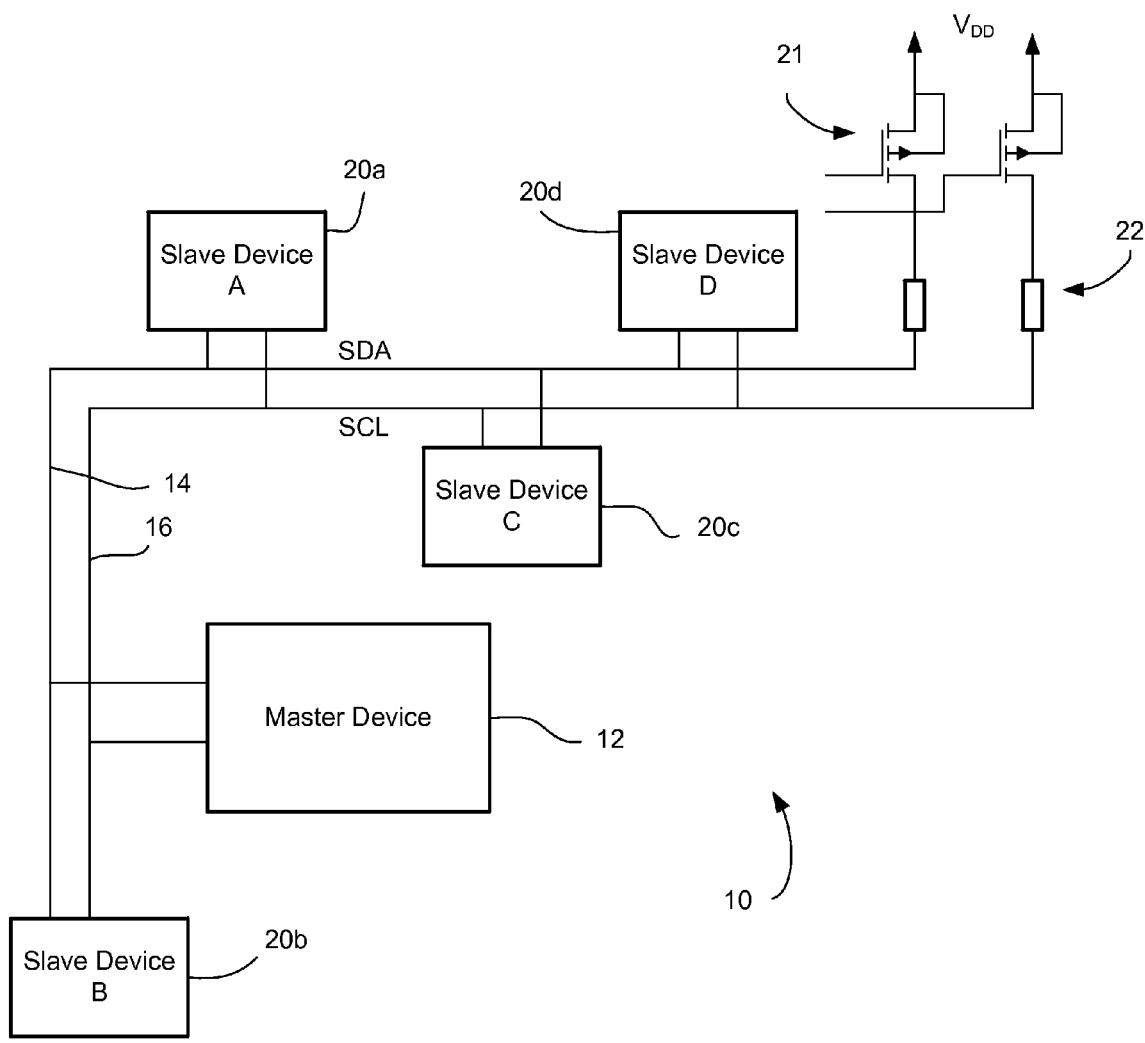
FIG. 1 diagrammatically shows one example of a multi-device two-wire bidirectional communications bus.

In one aspect, the present application describes a method of emulating a bi-directional synchronous communications protocol for bi-directional bus communication using unidirectional channels between a first device and a second device, wherein the protocol prescribes a frame structure in which each frame is to contain data from one device in a first data position within the frame and data from another device in a second data position within the frame, the first device having a digital controller to generate outgoing data and a physical interface with the bus. The method includes, within the physical interface, receiving the outgoing data from the digital controller and transmitting the outgoing data to the second device over a first unidirectional channel, wherein the outgoing data has the frame structure and contains first data in the first data position in a first frame; buffering the outgoing data; receiving incoming data from the second device over a second unidirectional channel, wherein the incoming data has the frame structure and contains second data in the second data position in a second frame; combining the first data and the second data to create a reconstructed bidirectional frame; and sending the reconstructed bidirectional frame to the digital controller.

In another aspect, the present application describes a first device to communicate with a second device over unidirectional channels but internally emulating a bi-directional synchronous communications protocol, wherein the protocol prescribes a frame structure in which each frame is to contain data from one device in a first data position within the frame and data from another device in a second data position within the frame. The first device includes a digital controller operating in accordance with the protocol to generate outgoing data and a physical interface to receive the outgoing data from the digital controller and transmit the outgoing data to the second device over a first unidirectional channel. The outgoing data has the frame structure and contains first data in the first data position in a first frame. The physical interface also receives incoming data from the second device over a second unidirectional channel. The incoming data has the frame structure and contains second data in the second data position in a second frame. The physical interface includes an aligner to buffer the outgoing data and align it with the incoming data, and a combiner to combine the first data and the second data to create a reconstructed bidirectional frame to be sent to the digital controller as input data.

In yet a further aspect, the present application describes non-transitory computer-readable media storing computer-executable program instructions which, when executed, cause a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is now made to FIG. 1, which diagrammatically shows an example of a two-wire bidirectional bus architecture 10. The bus architecture 10 includes at least one master device 12 connected to a data line 14 and a clock line 16, such as, for example, the SDA line and SCL lines in $I^2C$. Only one master device 12 is shown in this example.

Multiple slave devices 20 (shown as 20a, 20b, 20c, and 20d) are attached to the bus. Slave devices 20 may include any number of electronic devices of varying complexity. Non-limiting examples include A/D and D/A converters, I/O ports, RAM, EEPROMs, smart cards, tuning circuits, modems, temperature sensors, pressure sensors, light sensors, accelerometers, gyroscopes, magnetometers, other sensors, switches, drivers, clocks, etc.

The data line 14 and clock line 16 may be connected to a positive voltage supply through, in some examples, pull-up resistors 22. In some embodiments, a PMOS transistor or other active device 21 may be placed between the pull-up resistors and the bus, if special communication schemes are used, e.g. NRZI (Non Return to Zero Inverted), DDR (Dual Data Rate, uses both clock edge for transfer) or tri-symbol encoding (transmitting information based on two data lines and using any data change as an indication of a corresponding clock change) as described in MIPI I$^3$C SensorWire bus protocol. This enables the bus to be backwards compatible with older open-collector/open drain topologies and be forward compatible with newer schemes such as NRZI. In yet other examples, the bus is compatible with the MIPI SoundWire™ specification.

The MIPI Sound Wire™ communication protocol uses a common bi-directional data channel with a single clock supplied by the master to the slave devices. The bi-directional nature of the data channel introduces delay problems since each bit time period must account for transmitter output driver delays, channel delays, receiver input delays, and other logic delays for a round-trip. In practical terms, a SoundWire™-compliant system is limited to approximately 20 MHz.

Figure 2:
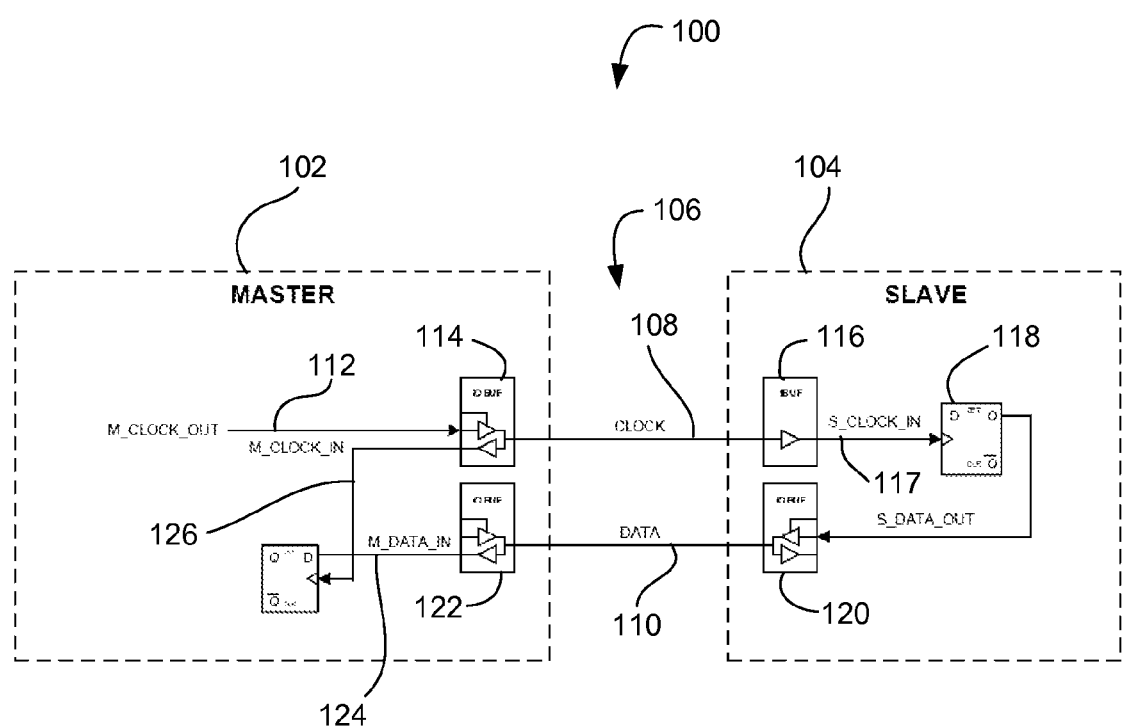
FIG. 2 shows an example of a SoundWire™ signal path with its various delays.

FIG. 2 shows the best-case scenario for round-trip signal path in a Sound Wire™-compliant system 100. A master device 102 is connected to a slave device 104 by a communications bus 106 formed from a clock channel 108 and a bi-directional data channel 110. The master device 102 generates a clock signal 112, which is sent using a first bus interface 114. This first bus interface includes a certain delay and may include a loop to return a feedback clock signal (M_CLOCK_IN) 126 internally within the master device 102 for clocking in received data. The feedback clock signal 126 in the master device 102 is taken from the first bus interface 114 to help eliminate I/O delays within the master device 102.

The transmitted clock signal is received by the slave device 104 via a second bus interface 116, which includes a certain delay, and results in an input slave clock signal (S_CLOCK_IN) 117. The input slave clock signal 117 is used to clock output of a slave data bit (S_DATA_OUT). The slave data bit is transmitted over the bi-directional channel using a third bus interface 120. The master device 102 receives the transmitted slave data bit at a fourth bus interface 122, which, after a certain buffer delay, provides the master device 102 with input data (M_DATA_IN) 124 that is clocked into the master device 102 using the feedback clock signal 126. It will be appreciated that the signal path and clock speed must account for multiple transmission path delays, interface buffer delays, flip-flop setup/hold requirements, etc.

In accordance with one aspect of the present application, a SoundWire™-compliant communication protocol is implemented by a master device, but the bus interface itself is configured with separate transmit and receive channels and uses source synchronous communications. Incoming communications from a slave device are resynchronized with the master communications within the physical interface to create a reconstructed combined communication that is presented to the digital portion of the master device as a SoundWire™-compliant input communication.

By using source synchronous communications, the delays associated with the channel and the interface/drivers need not be accounted for in selecting clock speed. In other words, much higher transmission rates are achievable. The receiver clock is independent of the transmitter clock.

Figure 3:
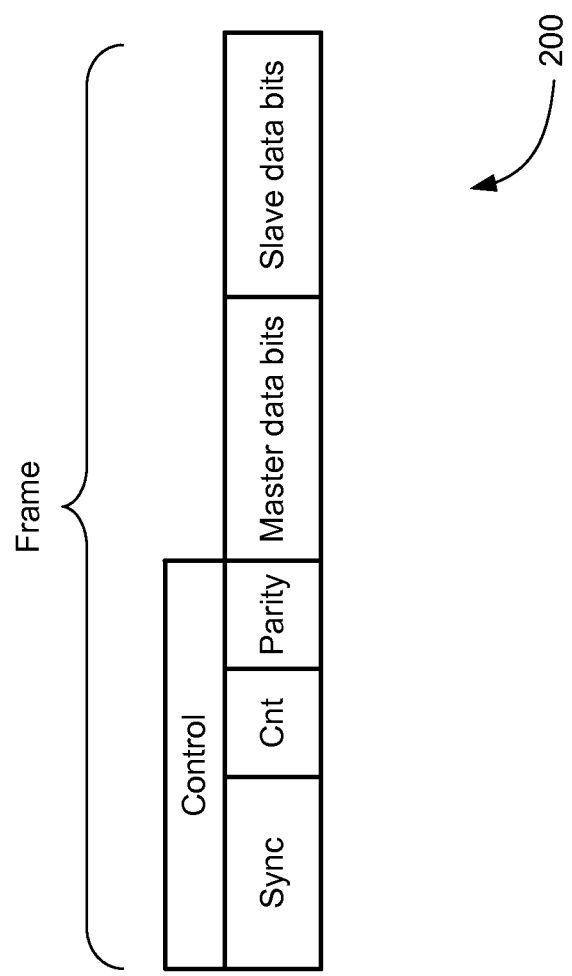
FIG. 3 shows the framing structure of a SoundWire™ communication.

Reference is now made to FIG. 3, which shows a SoundWire™ frame structure 200. The frame structure 200 begins with a synchronization pattern. This pattern is generated by the master device. The synchronization bits change for each frame in a deterministic pattern that allows the slave devices on the bus to sync to the bus. The synchronization bits are partly static and partly dynamic, and appear in a 15-frame cycle. The synchronization bits are part of control data that begins each frame. The control data also includes commands (normally from master to slave), such as read, write, ping, etc. The control data may also include a parity bit for error detection.

The frame structure 200 then includes, for each frame, a payload containing master data and slave data. Certain bit positions of the frame are allocated to contain master data (if any) and certain bit positions of the frame are allocated to contain slave data (if any).

To enable source synchronous communications and resynchronization of data at the master in accordance with the present application, a slave device may independently generate the synchronization pattern for sending its own data to the master, rather than inserting its data into the designated locations in the master bitstream on the bus.

Figure 4:
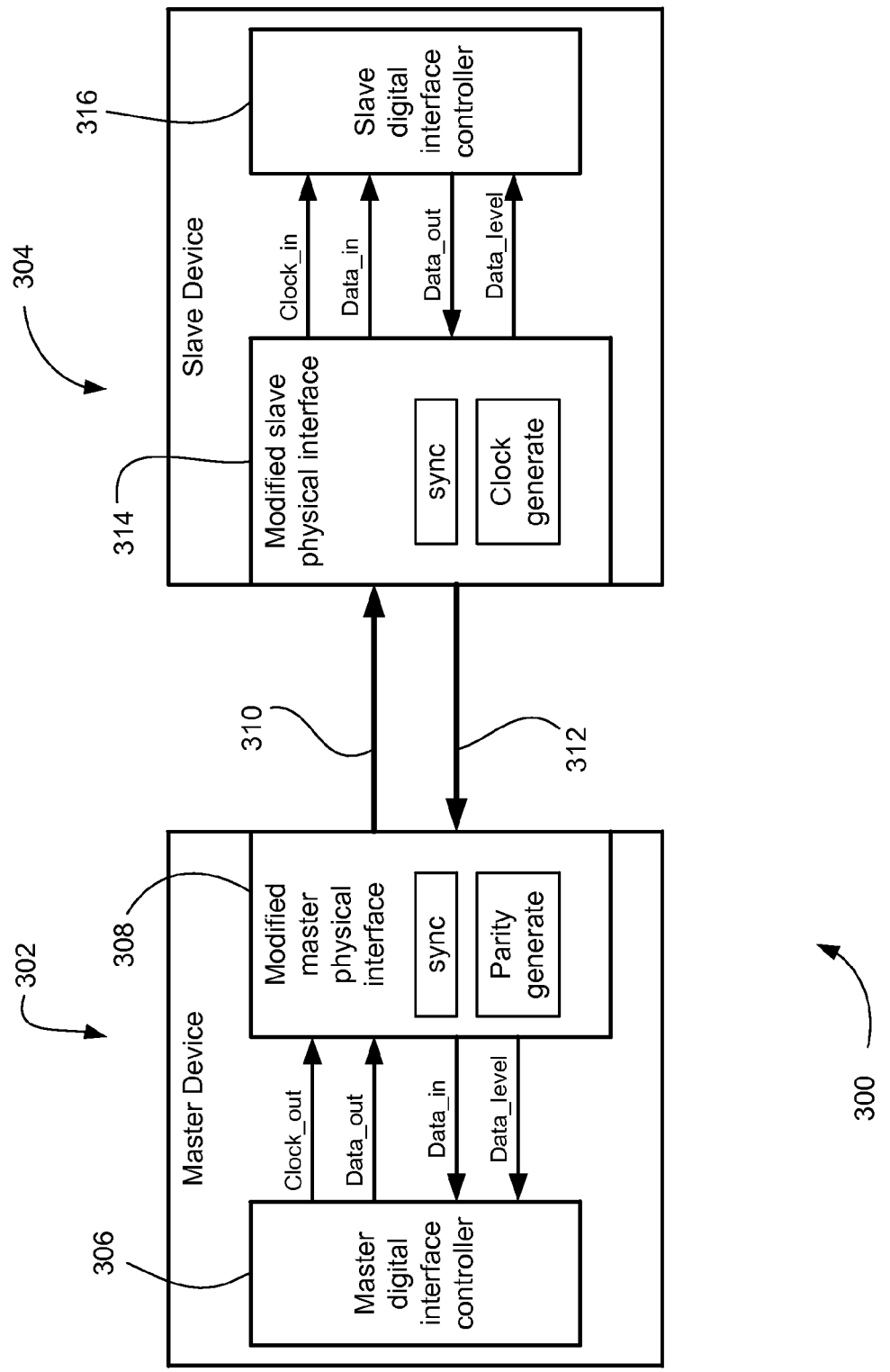
FIG. 4 diagrammatically shows an example of a master-slave communication architecture that internally uses SoundWire™-compliant communications, but with modified physical interfaces.

Reference is now made to FIG. 4, which shows a block diagram of one example embodiment of a system 300 that emulates a SoundWire™-compliant bus but uses separate transmit and receive channels instead of a common bi-directional data channel/bus. The system 300 includes a master device 302 and a slave device 304. The master device 302 includes a master digital interface controller 306 that outputs a clock signal and data in accordance with the SoundWire™ specification. The master device 302 further includes a modified master physical interface 308 that receives the clock signal and the output data from the master digital interface controller 306 and transmits an output master bitstream 310 over a transmit channel. The modified master physical interface 308 receives an incoming slave bitstream 312 over a separate receive channel. The outgoing output master bitstream 310 and the incoming slave bitstream 312 may both be structured to have the same format as a SoundWire™-compliant communication.

The modified master physical interface 308 performs functions normally handled by the PHY of a SoundWire™-compliant device; namely, it translates between the voltage levels on the bus and/or receive/transmit lines and the physical signal levels for logic low and logic high used for input and output data with the master digital interface controller 306. It also provides a data_level signal related to parity check within the master digital interface controller 306. The data_level signal emulates the data_level signal required by a SoundWire™-compliant interface, and takes into account the parity status of the modified master physical interface 308.

The modified master physical interface 308 additionally reconstructs a SoundWire™-compliant bitstream for presentation to the master digital interface controller 306, by combining, aligning and buffering the data_out bitstream with the bitstream received from the slave device(s). Because the signals are sent on separate transmit and receive lines as separate bitstreams, the modified master physical interface 308 needs to resynchronize the master data and slave data so that the data_in signals provided to the master digital interface controller 306 appears as though they are from a SoundWire™ bus. This includes buffering the master bitstream, aligning incoming slave bitstream data with the master bitstream, and inserting the appropriate slave data bits from the slave bitstream into designated slave data bit slots in the master bitstream to create a reconstructed bitstream in the SoundWire™ format.

The output data that the modified master physical interface 308 receives from the master digital interface controller 306 is structured in a frame-based format, including synchronization bits that vary from frame-to-frame in a deterministic pattern. Each frame also includes a set of bit slots designated for, and containing, master data, and a set of bit slots designated for slave data. The bit slots for slave data may be null data or "don't care" data.

The incoming data from the slave device 304 is also structured in a frame-based format and includes synchronization bits using the same deterministic pattern. In many embodiments, the incoming data is in a SoundWire™-based frame structure. The modified master physical interface 308 aligns or matches the buffered master bitstream with the slave bitstream on the basis of the synchronization pattern. That is, the modified master physical interface 308 extracts slave data bits from a received slave frame having a particular synchronization code (set of bits) and identifies the buffered master frame having the same synchronization code. It then inserts those extracted slave data bits into the matched master frame with the same synchronization code to generate a reconstructed frame. The reconstructed frame is sent to the master digital interface controller 306 as a data_in signal, and will appear to be a SoundWire™-compliant data_in input signal.

The reconstruction may further include adjusting a parity bit, if required.

The reconstruction may also include generating a data_level signal based on the reconstructed frame, and sending the data_level signal to the master digital interface controller 306.

The slave device 304 includes a modified slave physical interface 314. The modified slave physical interface 314 functions in a similar manner to the modified master physical interface 308. It may also include a synchronization pattern generator for generating the synchronization pattern independently of the incoming master signal. That is, it does not rely on the master device 302 as the generator of the synchronization pattern, but instead generates the same pattern itself for creating packets/frames of slave data each having synchronization bits in accordance with the pattern.

In some embodiments, the modified slave physical interface 314 may include an aligning and reconstruction component for combining the incoming master signal and the outgoing slave signal into a reconstructed SoundWire™-compliant signal to be passed to a slave digital interface controller 316.

The modified slave physical interface 314 may also generate a clock signal clock_in for input to the slave digital interface controller, since it may not receive a clock signal on a dedicated clock line in some instances. In some cases, it may recover a clock signal from the transmit channel carrying the output master bitstream 310 using, for example, a phase-locked loop or the like.

Figure 6:
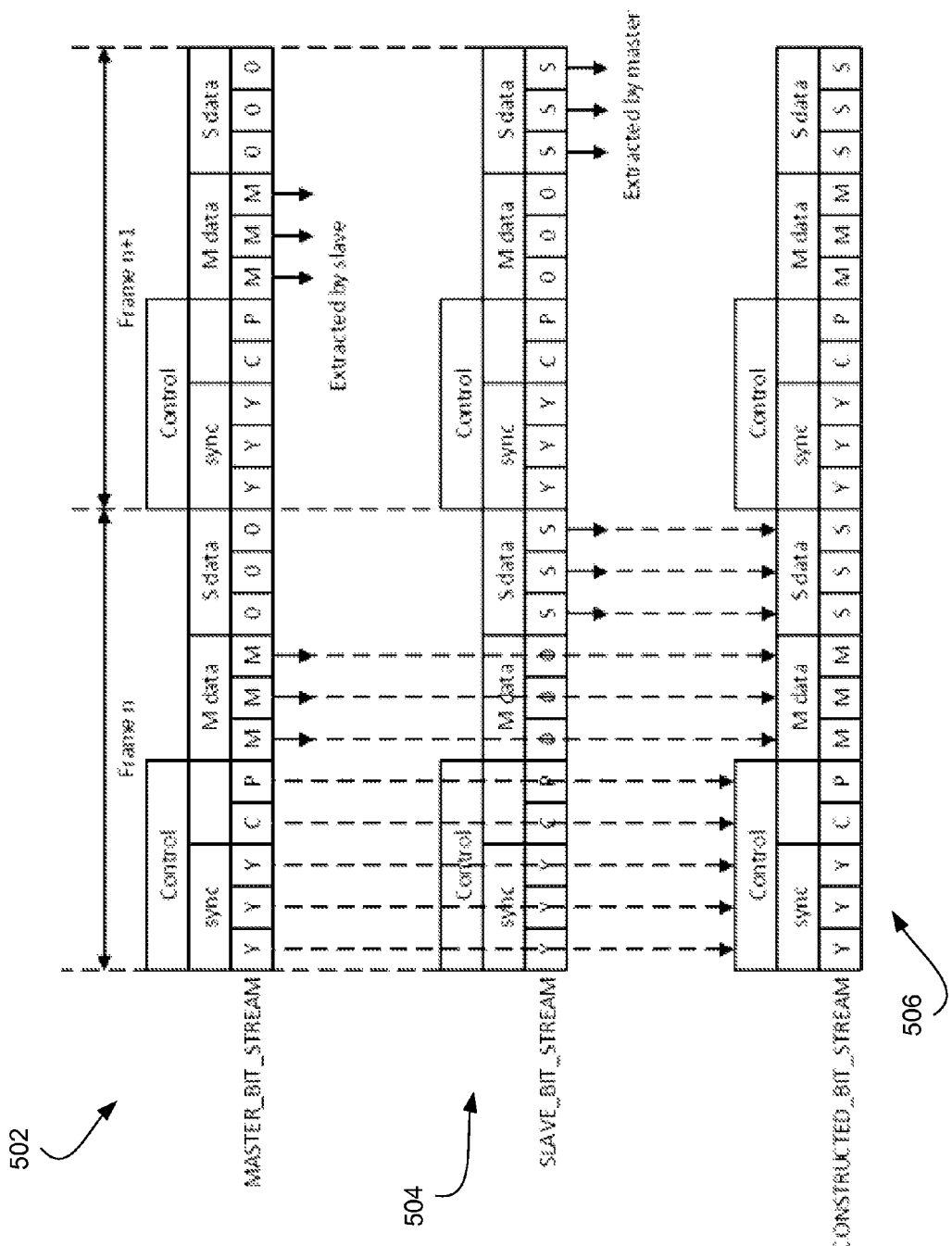
FIG. 6 illustrates example bitstreams for one embodiment.

Reference is now made to FIG. 6, which illustrates the structure of example bitstreams sent by the master device 302 (FIG. 4) and sent by the slave device 304 (FIG. 4), respectively. In particular, master_bit_stream 502 shows the structure of an example outgoing bitstream from the master device 302. The slave device 304 receives the master_bit_stream 502 and extracts the master data bits and takes whatever action is required in view of the command codes provided.

Meanwhile, the slave device 304 independent generates its own slave_bit_stream 504 using the same sync pattern generator. In this manner the slave device 304 creates a slave_bit_stream 504 that does not necessarily wait for receipt and reading of the master_bit_stream 502 with a given sync pattern before generating and sending a slave_bit_stream 504 having that same sync pattern. The master data slots in the outgoing slave_bit_stream 504 are zero or "don't care".

At the master device 302, the buffered outgoing master_bit_stream 502 and the received slave_bit_stream 504 are aligned on the basis of matching sync patterns and a reconstructed_bit_stream 506 is formed through combining the master bits from the master data slots of the master_bit_stream 502 with the slave bits from the slave data slots of the slave_bit_stream 504. The result is the reconstructed_bit_stream 506 that appears as though it was generated using SoundWire™-compliant bus communications, i.e. in which the master device generated the bitstream on the bus at slow enough rate that the slave device is able to read the control and master data slots and insert its own slave data bits into the slave slots for reading by the master device, taking into account all the delays in the roundtrip path. Accordingly, by using separate transmit and receive paths, and an independently-generated sync pattern at the slave device, the communication speed may be increased.

Figure 5:
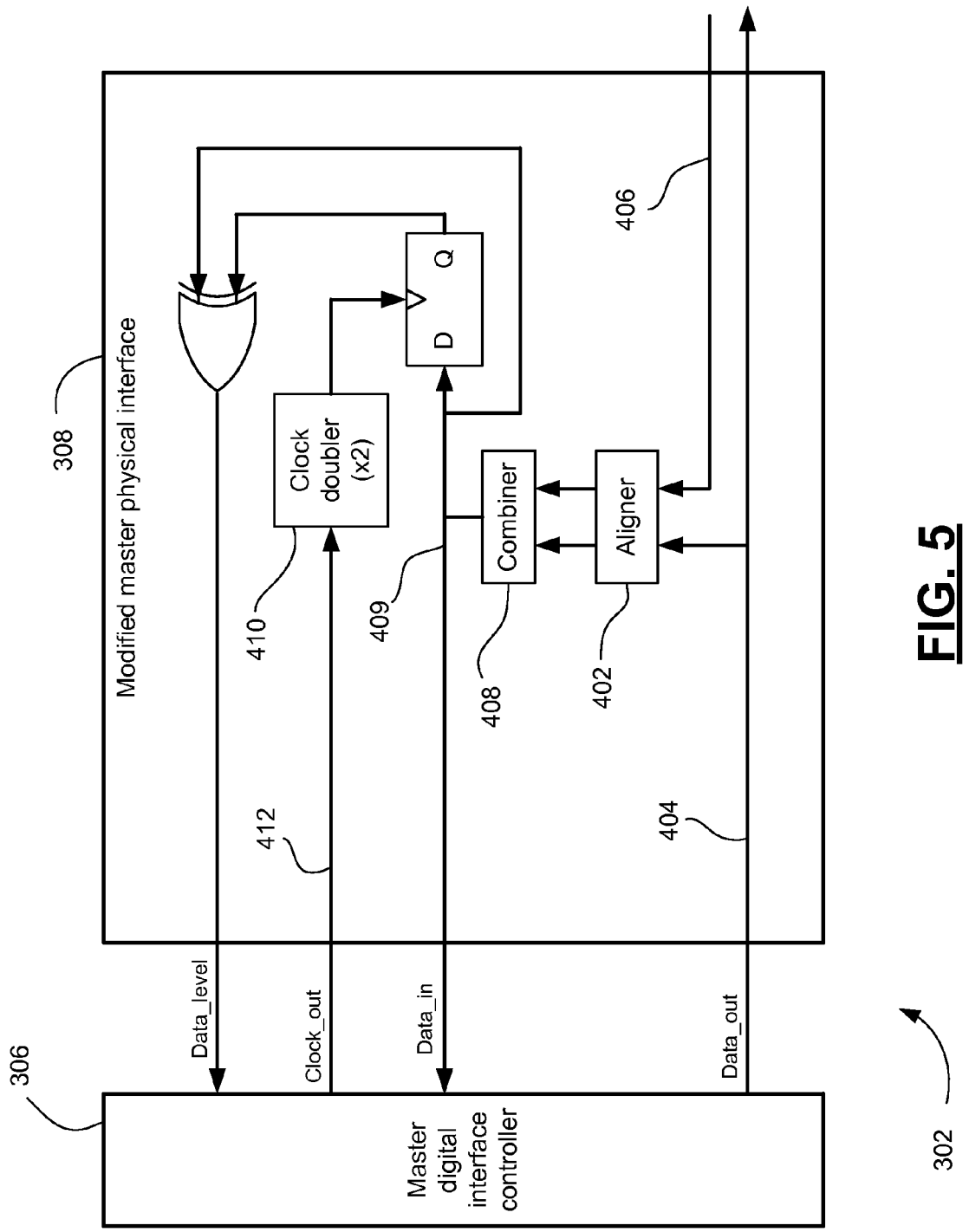
FIG. 5 shows one example of a modified physical interface for emulating SoundWire™ but using separate one-way channels for communications.

Reference is now made to FIG. 5, which shows, in simplified block diagram form, one example of the master device 302, including the master digital interface controller 306 and the modified master physical interface 308. The modified master physical interface 308 includes an aligner 402 for aligning an incoming master bitstream 404 with an incoming slave bitstream 406. The aligner 402 may include buffering of the incoming master bitstream 404, or buffering of both bitstreams 404, 406. The aligner 402 aligns the bitstreams on the basis of matching synchronization bits.

Once the bitstreams are aligned by the aligner 402, a combiner 408 generates a reconstructed bitstream 409 by extracting the slave bits from the designated positions in the slave bitstream 406 and placing them in corresponding designated slave bit positions in the corresponding portion of the master bitstream 404. The reconstructed bitstream 409 is then returned to the master digital interface controller 306 as a data_in signal.

The modified master physical interface 308 further includes a clock doubler 410 for doubling an incoming clock signal 412, which is then input to a D-type flip flop (e.g. a delay) that clocks the reconstructed bitstream 409 through at the doubled clock speed. This signal is then exclusive OR'd with the reconstructed bitstream 409 to create the data_level signal. Note that the clock signal 412 is not output from the modified master physical interface 308 as a signal to a slave device. The clock doubler 410 is used because the Data_out and Data_in signals are DDR signals that change on both edges of the clock. In another embodiment, the clock doubler 410 and flip flop may be replaced with a double-edge flip flop.

Note that, for simplification and ease of understanding, the foregoing description depicts the bitstream as having the structure of the framing described in FIG. 3, whereas it will be appreciated that the actual SoundWire™ protocol prescribes interleaving of data for a frame. This is described in SoundWire™ as a conceptual 2-dimensional Frame.

Although the examples shown in FIGS. 4 and 5 illustrate separate unidirectional transmit and receive channels for the master bitstream and the slave bitstream, in some embodiments the channels may be combined in a common physical wire, such as through frequency multiplexing. An optical channel may interconnect the master device and the slave device in some instances.

In another example, clock signals are also send from master to slave and from slave to master in respective transmit and receive clock channels.

The channels may be implemented wirelessly in some embodiments, using frequency multiplexing or spatial separation.

It will be appreciated that the processes and systems according to the present application may be implemented in a number of computing devices, including, without limitation, servers, suitably-programmed general purpose computers, and mobile devices. The processes may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the devices described herein and the module, routine, process, thread, or other software components implementing the described methods/processes may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of emulating a hi-directional synchronous communications protocol for bi-directional bus communication using unidirectional channels between a first device and a second device, wherein the protocol prescribes a frame structure in which each frame is to contain data from one device in a first data position within the frame and data from another device in a second data position within the frame, the first device having a digital controller to generate outgoing data and a physical interface with the unidirectional channels, the method comprising:
within the physical interface,
receiving the outgoing data from the digital controller and transmitting the outgoing data to the second device over a first unidirectional channel, wherein the outgoing data has the frame structure and contains first data in the first data position in a first frame;
buffering the outgoing data;
receiving incoming data from the second device over a second unidirectional channel, wherein the incoming data has the frame structure and contains second data in the second data position in a second frame;
combining the first data and the second data to create a reconstructed bidirectional frame; and
sending the reconstructed bidirectional frame to the digital controller.

2. The method claimed in claim 1, wherein buffering comprises aligning the outgoing data with the incoming data on the basis of matching synchronization bits.

3. The method claimed in claim 2, wherein the synchronization bits follow a deterministic pattern and wherein both the first device and the second device independently generate the synchronization bits for insertion into the outgoing data and the incoming data, respectively.

4. The method claimed in claim 1, further comprising generating a data_level signal from the reconstructed bidirectional frame and sending the data_level signal to the digital controller.

5. The method claimed in claim 4, wherein generating comprises:
doubling a clock signal to create a doubled clock signal;
clocking a D-type flip flop using the doubled clock signal, wherein the D-type flip flop receives the reconstructed bidirectional frame, to produce a double-clocked reconstructed frame; and
exclusive OR'ing the double-clocked reconstructed frame with the reconstructed bidirectional frame to generate the data_level signal.

6. The method claimed in claim 1, wherein combining further includes comparing synchronization bits from the second frame with synchronization bits from the first frame and determining that they match.

7. The method claimed in claim 1, wherein the first device comprises a master device and wherein the second device comprises a slave device.

8. The method claimed in claim 1, wherein the physical interface does not output a clock signal to the second device.

9. The method claimed in claim 1, wherein the first frame includes null data in the second data position.

10. The method claimed in claim 1, wherein the second frame includes null data in the first data position.

11. The method claimed in claim 1, wherein the protocol comprises SoundWire™ communications protocol.

12. A first device to communication with a second device over unidirectional channels but internally emulating a bi-directional synchronous communications protocol, wherein the protocol prescribes a frame structure in which each frame is to contain data from one device in a first data position within the frame and data from another device in a second data position within the frame, the first device comprising:
a digital controller operating in accordance with the protocol to generate outgoing data; and
a physical interface to receive the outgoing data from the digital controller and transmit the outgoing data to the second device over a first unidirectional channel, wherein the outgoing data has the frame structure and contains first data in the first data position in a first frame, and to receive incoming data from the second device over a second unidirectional channel, wherein the incoming data has the frame structure and contains second data in the second data position in a second frame, the physical interface including
an aligner to buffer the outgoing data and align it with the incoming data, and
a combiner to combine the first data and the second data to create a reconstructed bidirectional frame to be sent to the digital controller as input data.

13. The first device claimed in claim 12, wherein the aligner aligns the outgoing data with the incoming data on the basis of matching synchronization bits.

14. The first device of claimed in claim 13, wherein the synchronization bits follow a deterministic pattern and wherein both the first device and the second device independently generate the synchronization bits for insertion into the outgoing data and the incoming data, respectively.

15. The first device claimed in claim 12, wherein the physical interface includes a level generator to generate a data_level signal from the reconstructed bidirectional frame to be sent to the digital controller.

16. The first device claimed in claim 15, wherein the level generator comprises:
   a clock doubler to double a clock signal to create a doubled clock signal;
   a D-type flip flop clocked by the doubled clock signal, wherein the D-type flip flop receives the reconstructed bidirectional frame, to produce a double-clocked reconstructed frame; and
   an exclusive OR receiving the double-clocked reconstructed frame and the reconstructed bidirectional frame to generate the data_level signal.

17. The first device claimed in claim 12, wherein the first device comprises a master device and wherein the second device comprises a slave device.

18. The first device claimed in claim 12, wherein the physical interface does not output a clock signal to the second device.

19. The first device claimed in claim 12, wherein the first frame includes null data in the second data position.

20. The first device claimed in claim 12, wherein the second frame includes null data in the first data position.

* * * * *

UNITED STATES PATENT AND TRADEMARK OFFICE
CERTIFICATE OF CORRECTION

PATENT NO.         : 9,727,519 B2
APPLICATION NO.    : 14/835797
DATED              : August 8, 2017
INVENTOR(S)        : Jerrold Richard Randell Page 1 of 1

It is certified that error appears in the above-identified patent and that said Letters Patent is hereby corrected as shown below:

In Claim 1, Line 1, the term "hi-directional" should read --bi-directional--.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*